(No Model.) 2 Sheets—Sheet 1.

J. ARBTIN & W. J. ANDERSON.
VEHICLE WHEEL.

No. 471,933. Patented Mar. 29, 1892.

WITNESSES:
F. L. Durand
W. L. Coombs.

INVENTORS:
John Arbtin and
William J. Anderson,
by Sauis Dagger & Co.
Attorneys.

THE NORRIS PETERS CO., PHOTO-LITH., WASHINGTON, D. C.

(No Model.) 2 Sheets—Sheet 2.
J. ARBTIN & W. J. ANDERSON.
VEHICLE WHEEL.
No. 471,933. Patented Mar. 29, 1892.
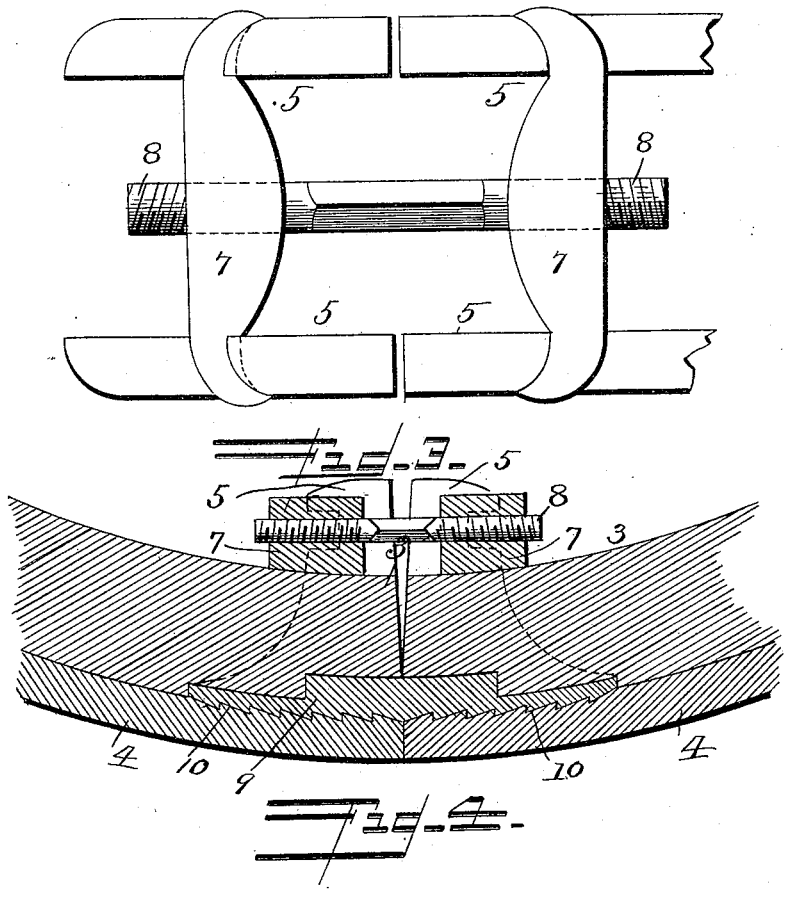
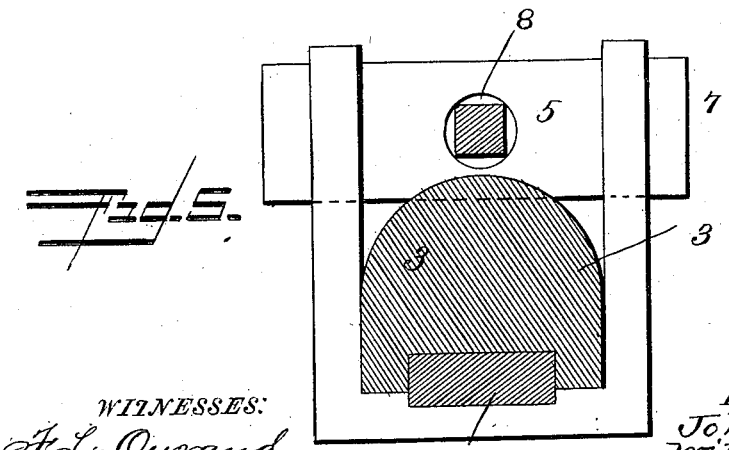
WITNESSES:
F. L. Ourand
Jo. L. Coombs
INVENTORS:
John Arbtin
William J. Anderson
by Saus Daggett & Co
Attorneys

UNITED STATES PATENT OFFICE.

JOHN ARBTIN AND WILLIAM J. ANDERSON, OF DES MOINES, IOWA.

VEHICLE-WHEEL.

SPECIFICATION forming part of Letters Patent No. 471,933, dated March 29, 1892.

Application filed October 13, 1891. Serial No. 408,592. (No model.)

*To all whom it may concern:*

Be it known that we, JOHN ARBTIN and WILLIAM J. ANDERSON, both citizens of the United States, and residents of Des Moines, in the county of Polk and State of Iowa, have invented certain new and useful Improvements in Vehicle-Wheels; and we do hereby declare that the following is a full, clear, and exact description of the invention, which will enable others skilled in the art to which it appertains to make and use the same, reference being had to the accompanying drawings, which form a part of this specification.

Our invention relates to vehicle-wheels, the object being to provide an improved construction of the same, whereby the tire can be tightened when it becomes loose in an expeditious and efficient manner. As is well known, the tires of ordinary vehicle-wheels are very liable in hot weather to work loose, due to the expansion of the metal of which they are composed and the contraction of wooden fellies constituting the rim, thus rendering it necessary to take the wheel to a blacksmith or wheelwright in order to have the tire reset.

By our invention when the tire becomes loose from the above or other causes it can be readily tightened by an unskilled person, thus effecting a great saving in time and labor.

The invention consists in a vehicle-wheel the tire of which is made in sections, with means for adjustably connecting said sections, as hereinafter fully described and claimed.

Figure 1:
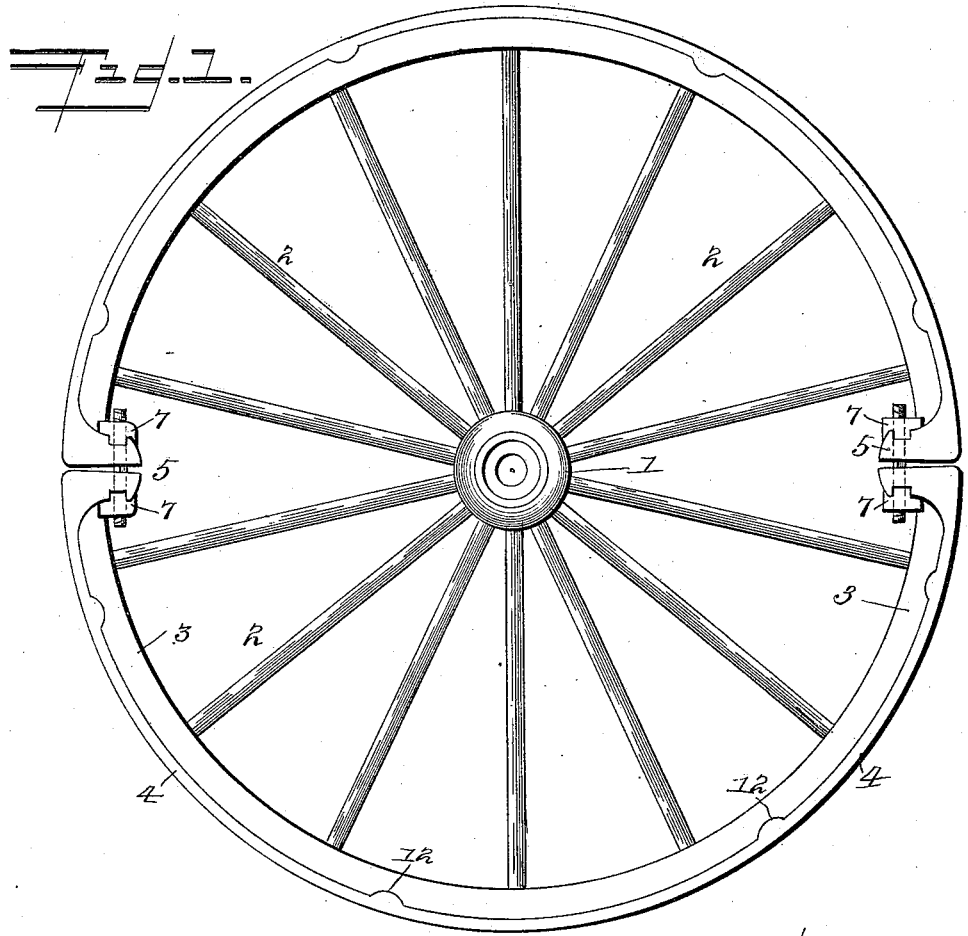
Figure 2:
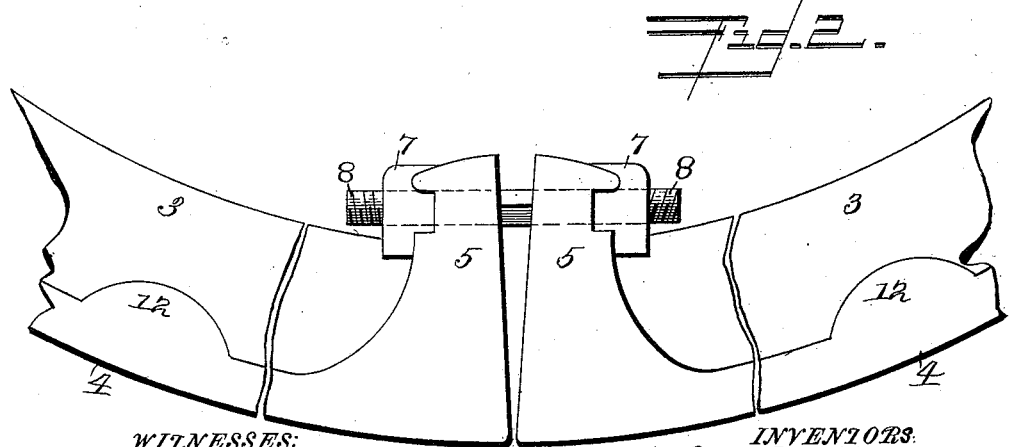

In the accompanying drawings, Figure 1 is a side view of a vehicle-wheel constructed in accordance with my invention. Fig. 2 is a side view, on an enlarged scale, of the meeting points or ends of said sections. Fig. 3 is a top view of the same. Fig. 4 is a longitudinal section taken through the center of Fig. 2, and Fig. 5 a cross-section.

In the said drawings the reference-numeral 1 designates the hub; 2, the spokes; 3, the wooden fellies, and 4 the metal tire, being shown in this instance as composed of two sections. The ends of these sections are formed with inwardly-projecting lugs 5, provided near their ends with slots or recesses 6 to receive the ends of the transverse bars 7, having screw-threaded apertures at their centers, through which pass the screw-rods 8, having right and left hand screw-threads formed thereon. These rods at their centers are square or angular in cross-section to receive a wrench by which they are turned.

At the points where the tires meet the fellies are cut away to receive a metal key 9, having a series of oppositely-arranged teeth 10 on its outer face, which engage with corresponding teeth on the inner side of the tire-sections and hold the same together when they are tightened by means of the screw-rods 8.

The operation will be readily understood. When the tires become loose, by turning the screw-rods 8 they will be brought together and held by means of the keys 9. A reverse movement of the screw-rods will loosen the tire.

To prevent the tire from slipping laterally upon the fellies, it is provided with ears or flanges 12 upon each side at suitable intervals apart, which project inwardly toward the hub of the wheel and embrace the sides of the fellies.

Having thus described our invention, we claim—

In a vehicle-wheel, the combination, with the fellies having recesses in their outer sides, of the tire-sections having the inwardly-projecting ears or flanges upon each side, the oppositely-arranged teeth, the inwardly-projecting lugs with slots or recesses, the transverse bars having screw-threaded apertures, the rods provided with right and left hand screw-threads, and the keys fitting in the recesses in the fellies and having oppositely-arranged teeth adapted to engage with the teeth in the tire-sections, subtantially as described.

In testimony that we claim the foregoing as our own we have hereunto affixed our signatures in presence of two witnesses.

JOHN ARBTIN.
WILLIAM J. ANDERSON.

Witnesses:
JOHN M. READ,
FANNIE STREET.